Oct. 20, 1953 M. RABBITT 2,655,894
GAS FILTER INDICATOR
Filed April 21, 1951

INVENTOR.
MILTON RABBITT
BY
Barlow & Barlow
ATTORNEYS

Patented Oct. 20, 1953

2,655,894

UNITED STATES PATENT OFFICE 2,655,894

GAS FILTER INDICATOR

Milton Rabbitt, Gregory, Mich., assignor to Fram Corporation, a corporation of Rhode Island Application April 21, 1951, Serial No. 222,175

3 Claims. (Cl. 116—117)

This invention relates to a gas filter or air cleaner of the type utilized in cleaning the air which passes into the carburetor of an internal combustion engine such as an automobile or may have various other uses.

In the use of many such filters, the construction is such that a cartridge containing the filtering material may be inserted into a casing so that when the cartridge has become clogged with dirt which it has removed from the air which passes through it, the filter element in cartridge form may be removed and replaced with a fresh one.

One of the objects of this invention is to provide an arrangement so as to indicate when the cartridge has become so filled with dirt or contaminant that it should be removed and replaced by a fresh one.

Another object of this invention is to provide a simple and inexpensive construction which may be readily observed to indicate when the change of cartridge is desired.

Another object of the invention is to provide a construction which when the indicator has moved to show that the cartridge needs replacing, it will stay in this position.

Another object of the invention is to provide an indicator which will indicate a clogged condition of the cartridge which results from the running of the apparatus upon which the filter is mounted and which will remain in a position to indicate a change is desired even after the equipment has ceased operation.

With these and other objects in view, the invention consists of certain novel features of construction, as will be more fully described and particularly pointed out in the appended claims.

Figure 1:
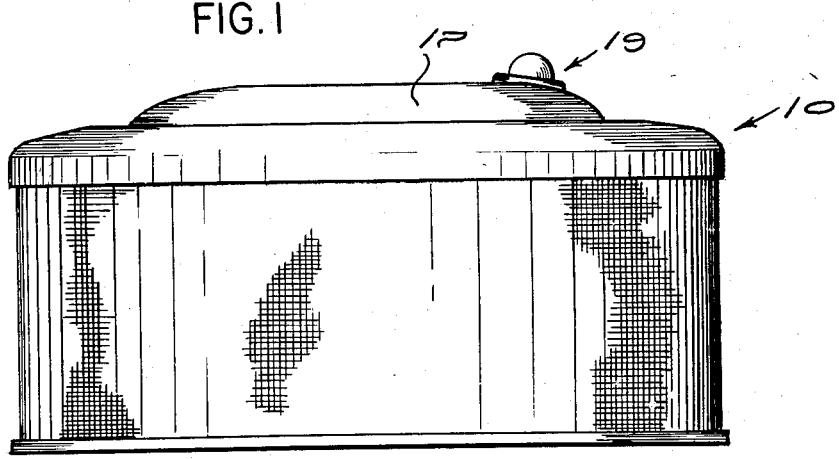
Fig. 1 is a side elevation of a filter element in the form of a cartridge which may be removed from the filtering mechanism.

In proceeding with this invention, I provide a hole in a wall of the casing (chamber or duct) downstream of the filter element cartridge which is so located that should it not be closed, the filtering material within the cartridge would be by-passed by air passing through the hole. I then mount in this hole some pressure separator such as a diaphragm which will normally bulge outwardly but should there be a differential pressure to a certain predetermined amount, the diaphragm would then be drawn inwardly and would remain in this position until again manually pushed outwardly.

With reference to the drawings, 10 designates generally a filter element cartridge consisting of an outer annular screen wall 11, and inner annular screen wall 12 which is closed by an annular bottom wall 13 and an annular top wall 14. The filter material 15 is placed between the screens 11 and 12 and the upper and lower annular walls 13 and 14. This filter material comprises a mixture of casein fiber and wool, all of which is more particularly disclosed in co-pending application Ser. No. 178,639. The upper end of this cartridge is closed by a wall 16 having an annular arched portion 17, which closure forms the upper part of a filter casing with which the element is assembled. The filter element cartridge is set into another casing which closes the bottom and which casing is provided with a discharge opening into the carburetor or other device from the center of the cartridge.

Figure 2:
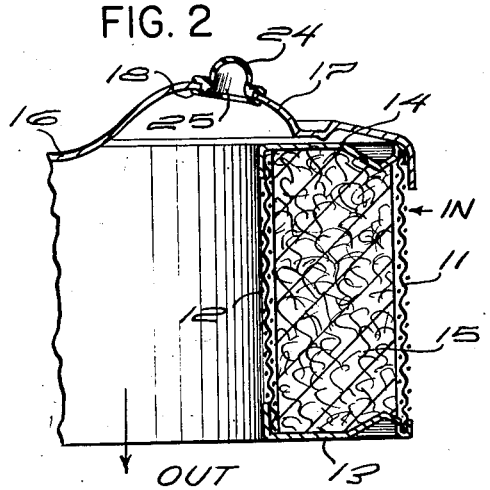
Fig. 2 is a fragmental sectional view through the filter element cartridge with the indicating device assembled thereon, showing the device in a position to indicate the cartridge is clear.
Figure 3:
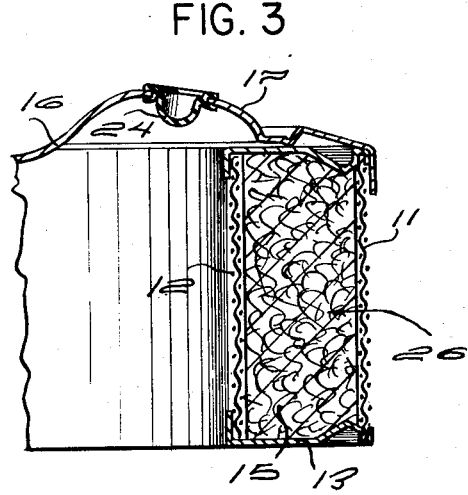
Fig. 3 is a view similar to Fig. 2 but showing the indicator as in the position to show the cartridge should be changed.
Figure 4:
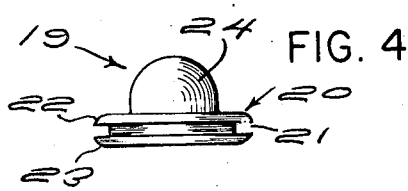
Fig. 4 is a perspective view of the indicator alone.

A hole 18 is provided in the wall 16 at the location of the arched portion 17 and this opening is closed by a pressure separator designated generally 19 and shown in perspective in Fig. 4. This device consists of a grommet 20 having a groove 21 forming flanges 22 and 23 so that the same may be snapped into the opening 18 and will remain therein. A diaphragm 24 of elastic rubber material something in the form of a baby's rubber nipple is utilized for closing the central opening 25 of the grommet and bulges outwardly as shown in Fig. 2 in the normal form which it assumes. The gas or air to be filtered passes through the filter material as shown by the arrow 26 and should the screen or filter material become so restricted that the suction of the carburetor causes a pressure differential to occur beyond a certain amount, then the nipple-like diaphragm 24 will extravert itself or move from the position shown in Fig. 2 which extends outwardly of the wall to the position shown in Fig. 3 extending inwardly of the wall and this may be readily visible to one inspecting the filter so that it will be readily apparent that the filter element cartridge has become so restricted because of the collection of dirt that it is desired the same shall be changed, whereupon the used filter element may be removed and discarded and a fresh one having the indicator at the position shown in Fig. 2 positioned in its place.

I claim:

1. In a gas filter, means including walls forming a chamber, said chamber having entrance and discharge openings, an element comprising filtering material in said chamber located between said openings, a hole in one of said walls at a location to by-pass said element, a closure for said hole comprising an outwardly extending pressure separator in the form of a nipple-like diaphragm capable of being extraverted in the wall in which said hole is located upon the occurrence of a certain pressure differential to indicate restricting of the passage of air through said element from the entrance opening to the discharge opening of said chamber.

2. In a gas filter as in claim 1 wherein the diaphragm is elastic rubber-like material.

3. In a gas filter as in claim 1 wherein the diaphragm is elastic rubber-like material mounted over the central opening with a grommet which may engage the edge of the wall in which said opening occurs.

MILTON RABBITT.

References Cited in the file of this patent

UNITED STATES PATENTS

| Number | Name | Date |
| --- | --- | --- |
| 1,959,759 | Hultberg | May 22, 1934 |
| 2,130,180 | Evans | Sept. 13, 1938 |
| 2,301,724 | Vischer | Nov. 10, 1942 |
| 2,341,771 | Hager | Feb. 15, 1944 |